US008592715B2

(12) United States Patent
Wang et al.

(10) Patent No.: US 8,592,715 B2
(45) Date of Patent: Nov. 26, 2013

(54) HYBRID WELDING METHOD AND HYBRID WELDING APPARATUS

(75) Inventors: Jingbo Wang, Hyogo (JP); Hitoshi Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 12/937,791

(22) PCT Filed: Nov. 27, 2008

(86) PCT No.: PCT/JP2008/003491
§ 371 (c)(1),
(2), (4) Date: Oct. 14, 2010

(87) PCT Pub. No.: WO2010/061422
PCT Pub. Date: Jun. 3, 2010

(65) Prior Publication Data
US 2011/0215074 A1 Sep. 8, 2011

(51) Int. Cl.
B23K 26/00 (2006.01)
B23K 9/00 (2006.01)
(52) U.S. Cl.
USPC .................. 219/121.64; 219/121.76; 219/136
(58) Field of Classification Search
USPC .............. 219/121.6–121.66, 121.76, 121.77, 219/136, 137 R, 137.2, 137.31, 137.7, 219/137.71, 137.8
See application file for complete search history.

(56) References Cited

U.S. PATENT DOCUMENTS

| 4,507,540 A * | 3/1985 | Hamasaki ................. 219/121.64 |
| 6,191,379 B1 * | 2/2001 | Offer et al. ...................... 219/75 |
| 7,015,417 B2 * | 3/2006 | Takikawa et al. ......... 219/121.64 |
| 7,253,377 B2 * | 8/2007 | Wang .......................... 219/137 R |
| 7,759,603 B2 * | 7/2010 | Aigner et al. ............. 219/121.63 |
| 2005/0284853 A1 * | 12/2005 | Takahashi et al. ......... 219/130.4 |

FOREIGN PATENT DOCUMENTS

| CN | 1663727 A | 9/2005 |
| CN | 101176954 A | 5/2008 |
| JP | 2001-205465 A | 7/2001 |
| JP | 2001-205465 A | 7/2001 |
| JP | 2002-346777 A | 12/2002 |
| JP | 2006-095559 A | 4/2006 |
| JP | 2008-093718 A | 4/2008 |
| JP | 2008-093718 A | 4/2008 |
| JP | 2008-229631 A | 10/2008 |
| JP | PCT/JP2008/003491 | 2/2009 |

OTHER PUBLICATIONS

Seiji Katayama et al., Penetration and Porosity Prevention Mechanism in YAG Laser-MIG Hybrid Welding, Osaka University, Joining and Welding Research Institute, Matsushita Welding Systems Col., Ltd. Engineering Group, Nov. 29, 2005, vol. 44 (2006) No. 3, pp. 99-109, Japan.

* cited by examiner

Primary Examiner — Sang Paik
(74) Attorney, Agent, or Firm — RatnerPrestia

(57) ABSTRACT

A first laser beam is radiated to a first radiation position of a welding object while intersecting a wire, and a second laser beam is radiated to a second radiation position that is spaced a predetermined distance from a target position of the wire. Arc welding is performed between the wire and the welding object while radiating the first laser beam and the second laser beam such that the first radiation position, the second radiation position, and the target position are disposed on a welding line of the welding object. In this way, it is possible to prevent the generation of spatter and perform welding at a high rate, without increasing the size of a molten pool.

31 Claims, 12 Drawing Sheets

FIG. 12

| COLUMN | a | b | c | d | e |
|---|---|---|---|---|---|
| LASER OUTPUT (kW) | 1.0 | 2.0 | 2.7 | 3.0 | 4.0 |
| CALCULATED VALUE OF POWER DENSITY AT RADIATION POINT OF WIRE (kW/mm²) | 0.78 | 1.56 | 2.10 | 2.33 | 3.11 |
| | | | | | |

HYBRID WELDING METHOD AND HYBRID WELDING APPARATUS

This application is a U.S. National Phase Application of PCT International Application No. PCT/JP2008/003491.

TECHNICAL FIELD

The present invention relates to a hybrid welding method and a hybrid welding apparatus that radiate laser beams to a welding object and perform arc welding.

BACKGROUND ART

Laser welding has high energy density and can be performed in a narrow heat-affected zone at a high speed. However, when there is a gap on a welding object, there is a concern that a laser beam will leak from the gap, which makes it difficult to perform welding. In order to solve this problem, many hybrid welding methods using consumable-electrode-type arc welding have been proposed.

For example, FIG. 13 is a block diagram illustrating the structure of a hybrid welding apparatus according to the related art. Laser generating unit 1 includes laser oscillator 2, laser transmitting unit 3, and focusing optical system 4. Focusing optical system 4 radiates laser beam 5 to the welding position of welding object 6. For example, an optical fiber or a combination of lenses is used as laser transmitting unit 3. Focusing optical system 4 includes one lens or a plurality of lenses. Wire 7 is fed to the welding position of welding object 6 through torch 9 by wire feeding unit 8. Arc generating unit 10 controls wire feeding unit 8. Arc generating unit 10 controls the wire feeding unit to feed wire 7 to the welding position of welding object 6 through torch 9 such that welding arc 11 is generated or stops between wire 7 and welding object 6. Control unit 12 controls laser generating unit 1 and arc generating unit 10. Although not shown in the drawings, laser oscillator 2 outputs a predetermined output value. In addition, laser oscillator 2 receives a signal of the output value set by control unit 12 and outputs a laser beam corresponding to the signal. Similar to laser generating unit 1, the output of arc generating unit 10 is controlled by control unit 12.

The operation of the hybrid welding apparatus having the above-mentioned structure according to the related art will be described below. When welding starts, although not shown in the drawings, control unit 12 receiving a welding start command transmits a laser welding start signal to laser generating unit 1 to start the radiation of laser beam 5. In addition, control unit 12 transmits an arc welding start signal to arc generating unit 10 to start arc discharge. In this way, welding starts. When welding ends, control unit 12 receiving a welding end command transmits a laser welding end signal to laser generating unit 1 to end the radiation of laser beam 5. In addition, control unit 12 transmits an arc welding end signal to arc generating unit 10 to end arc discharge. In this way, welding ends.

Various improvements of the above-mentioned hybrid welding method have been proposed. For example, PTL 1 discloses a technique in which the gap between laser radiation and arc discharge is set to a predetermined value at which arc does not interfere with laser, thereby improving the melting rate of a welding object. In the above-mentioned case, the laser beam does not directly irradiate to the wire and a welding current is almost used for arc welding. NPL 1 discloses a technique in which the size of a molten pool is substantially determined by the size of the molten pool formed by arc welding.

PTL 2 discloses a technique that radiates the laser beam to the wire to reduce the arc current and the size of the molten pool formed by arc welding. PTL 3 discloses a technique in which pulsed arc welding is used as arc welding and the pulse frequency of pulsed arc welding is controlled according to a laser-wire distance at the radiation point of the welding object, thereby improving the gap tolerance.

However, the related art does not disclose a hybrid welding method and a hybrid welding apparatus having all of the above-mentioned advantages. That is, in the related art, it is difficult to reduce arc energy or arc current required to melt the wire and reduce the size of the molten pool formed by welding arc. In addition, it is difficult to prevent the generation of spatter involving the rapid evaporation of a molten droplet formed at the end of the wire. It is also difficult to supply a high laser output to the welding position to obtain a high welding rate.

[PTL 1] Japanese Patent Unexamined Publication No. 2002-346777

[PTL 2] Japanese Patent Unexamined Publication No. 2008-93718

[PTL 3] Japanese Patent Unexamined Publication No. 2008-229631

[NPL 1] Seiji Katayama, Satoru Uchiumi, Masami Mizutani, Jing-Bo Wang, Koji Fujii, Penetration Characteristics and Porosity Prevention Mechanism in YAG Laser-MIG Hybrid Welding of Aluminum Alloy, Light Metal Welding, 44, 3 (2006)

DISCLOSURE OF THE INVENTION

An object of the invention is to provide a hybrid welding method and a hybrid welding apparatus capable of reducing arc energy or arc current required to melt a wire and the size of a molten pool formed by welding arc, preventing the generation of spatter involving the rapid evaporation of a molten droplet formed at the end of the wire, and supplying a high laser output to a welding position to obtain a high welding rate.

According to an aspect of the invention, there is provided a hybrid welding method of feeding a wire to a welding position of a welding object while radiating a first laser beam and a second laser beam to the welding position, thereby performing arc welding between the welding object and the wire. The hybrid welding method includes: radiating the first laser beam to a first radiation point of the welding object through the wire such that an optical axis of the first laser beam intersects a central axis of the wire; and radiating the second laser beam to a second radiation point of the welding object that is spaced a predetermined distance from a target position where the central axis of the wire intersects the welding object. The first radiation position, the second radiation position, and the target position are disposed on a welding line of the welding object.

According to the above-mentioned structure, it is possible to reduce arc energy or arc current required to melt a wire and the size of a molten pool formed by welding arc. In addition, it is possible to prevent the generation of spatter involving the rapid evaporation of a molten droplet formed at the end of the wire. It is also possible to supply a high laser output to the welding position using the second laser beam to obtain a high welding rate.

BRIEF DESCRIPTION OF THE DRAWINGS

FIG. 12 is a diagram illustrating the bead appearances when a laser output is changed in the hybrid welding apparatus.

PREFERRED EMBODIMENTS FOR CARRYING OUT THE INVENTION (First Embodiment)

Figure 1:
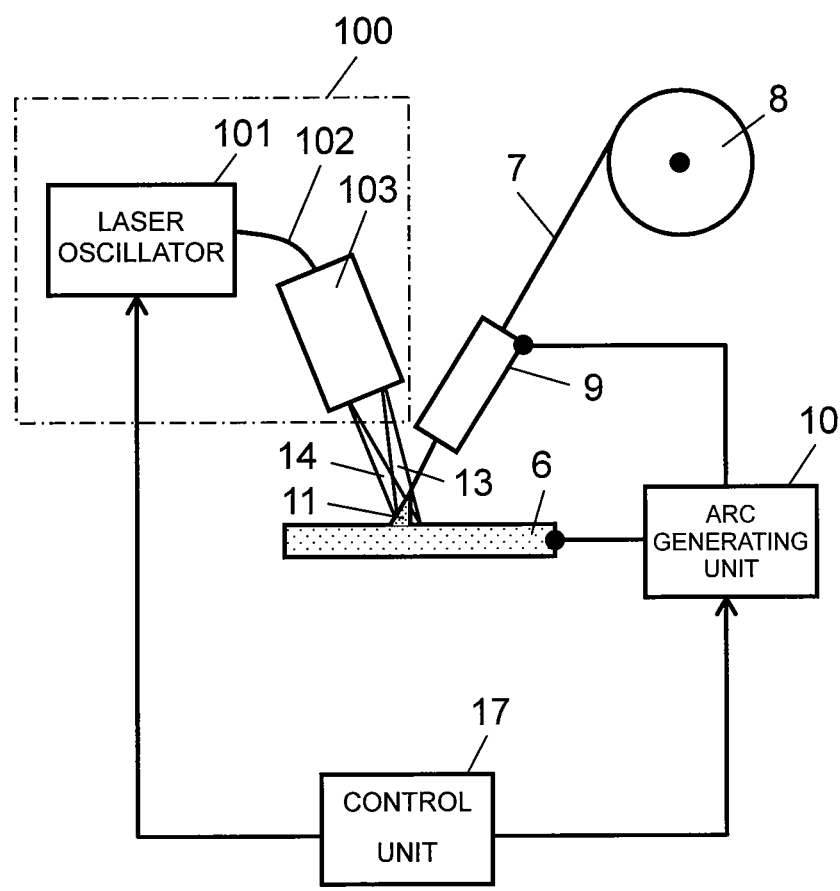
FIG. 1 is a diagram schematically illustrating a hybrid welding apparatus according to a first embodiment of the invention.

FIG. 1 is a diagram schematically illustrating a hybrid welding apparatus according to a first embodiment of the invention. In FIG. 1, laser generating unit 100 includes laser oscillator 101, laser transmitting unit 102, and focusing optical system 103. Laser generating unit 100 radiates first laser beam 13 and second laser beam 14 to the welding position of welding object 6. Focusing optical system 103 focuses first laser beam 13 and second laser beam 14 on the welding position of welding object 6. Laser transmitting unit 102 is, for example, an optical fiber or a combination of lenses. Focusing optical system 103 includes one lens or a plurality of lenses. Wire 7 is fed to the welding position of welding object 6 through torch 9 by wire feeding unit 8. Arc generating unit 10 controls wire feeding unit 8. In addition, arc generating unit 10 controls the wire feeding unit to feed wire 7 to the welding position of welding object 6 through torch 9 such that welding arc 11 is generated or stops between wire 7 and welding object 6. Control unit 17 controls laser generating unit 100 and arc generating unit 10. For example, control unit 17 is a computer, a device having a calculation function, or a robot. Although not shown in the drawings, laser oscillator 101 outputs a predetermined output value. In addition, laser oscillator 101 receives a signal of the output value set by control unit 17 and outputs the signal. Similar to laser generating unit 100, the output of arc generating unit 10 is controlled by control unit 17. As shown in FIG. 1, the hybrid welding apparatus according to this embodiment differs from the hybrid welding apparatus according to the related art shown in FIG. 13 in that, in this embodiment, laser oscillator 101 generates first laser beam 13 and second laser beam 14, focusing optical system 103 radiates first laser beam 13 and second laser beam 14 to the welding position of welding object 6, and control unit 17 controls laser oscillator 101 and focusing optical system 103.

Figure 2:
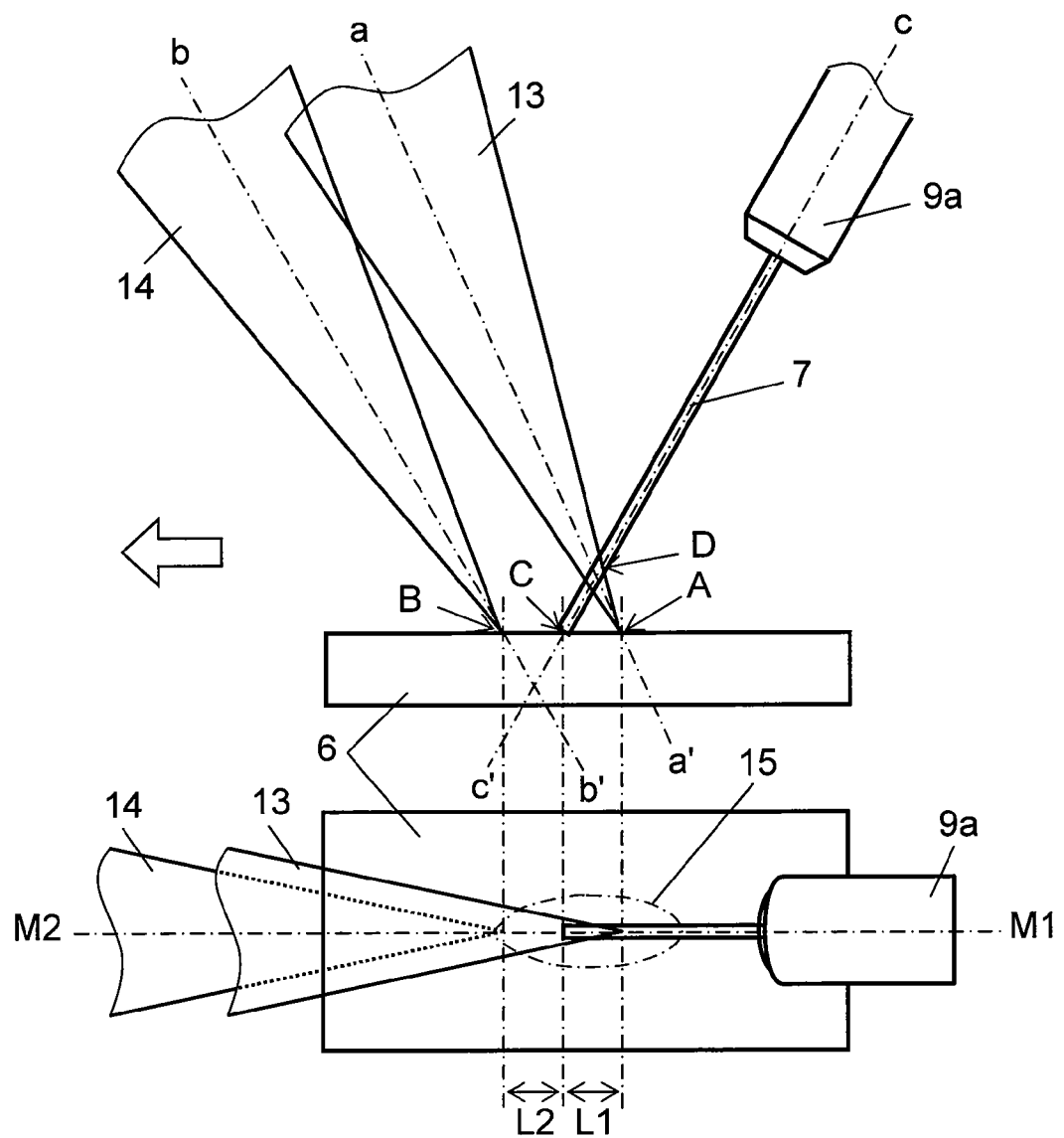
FIG. 2 is a diagram schematically illustrating the correlation between a laser radiation position and a wire target position in a hybrid welding method according to the first embodiment.

FIG. 2 is a diagram schematically illustrating the correlation between a laser radiation position and a wire target position in a hybrid welding method according to this embodiment. In FIG. 2, a side view and a top view are arranged in the vertical direction. Tip 9a is attached to the torch 9 and supplies power to wire 7. First laser beam 13 is radiated to first radiation position A on the surface of welding object 6. That is, first radiation position A on the surface of welding object 6 is disposed on optical axis aa' of first laser beam 13. Second laser beam 14 is radiated to second radiation position B on the surface of welding object 6. That is, second radiation position B on the surface of welding object 6 is disposed on optical axis bb' of second laser beam 14. Wire 7 is fed to target position C of welding object 6. That is, target position C on the surface of welding object 6 is disposed on central cc' of wire 7. First laser beam 13 is radiated to first radiation position A across wire 7. That is, laser radiation position D of wire 7 and first radiation position A on the surface of welding object 6 are disposed on optical axis aa' of first laser beam 13. In addition, target position C on the surface of welding object 6 and laser radiation position D of wire 7 are disposed on central axis cc' of wire 7. In this embodiment, focusing optical system 103 and torch 9 are arranged such that the above-mentioned positional relationship is established. Welding is performed along welding line M1M2 on the surface of welding object 6 in the direction of the bold arrow. In FIG. 2, welding line M1M2 is a straight line. However, welding line M1M2 may be a curved line according to the welding position. That is, first radiation position A, second radiation position B, and target position C are disposed on welding line M1M2 in this order. However, first radiation position A, target position C, and second radiation position B form a straight line for practical purposes. Molten pool 15 is formed at the welding position on the surface of welding object 6 by a welding operation using first laser beam 13, second laser beam 14, and wire 7. Therefore, molten pool 15 is formed on welding line M1M2. L1 denotes a laser-arc distance which indicates the distance between first radiation position A and target position C on the surface of welding object 6. L2 denotes a laser-arc distance which indicates the distance between second radiation position B and target position C on the surface of welding object 6. That is, second laser beam 14 is radiated to second radiation position B that is spaced predetermined distance L2 from target position C of wire 7.

Figure 3:
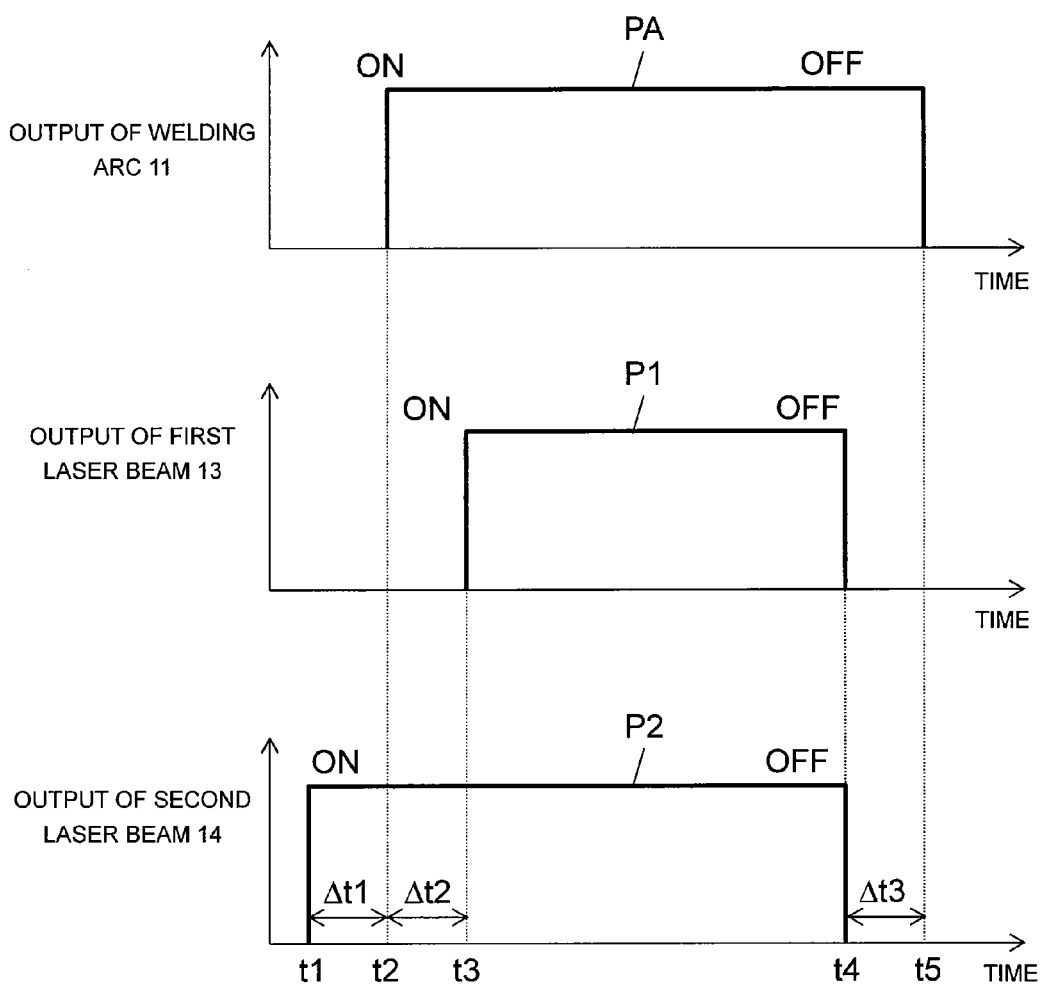
FIG. 3 is a diagram illustrating the operation timing of welding arc, a first laser beam, and a second laser beam in the first embodiment.

In this embodiment, an operation when welding starts and an operation when welding ends will be described with reference to FIG. 3. FIG. 3 is a diagram illustrating the operation timing of welding arc 11, first laser beam 13, and second laser beam 14 in the hybrid welding method according to this embodiment. When welding starts, as represented by signal P2, the output of second laser beam 14 is turned on at time t1. Then, at time t2 after period Δt1 has elapsed, as represented by signal PA, the output of welding arc 11 is turned on. Then, at time t3 after period Δt2 has elapsed, as represented by signal P1, the output of first laser beam 13 is turned on. That is, welding arc 11 is generated after predetermined period Δt1 has elapsed from the start of the radiation of second laser beam 14. Then, first laser beam 13 is radiated after predetermined period Δt2 has elapsed. The reason is as follows.

During period Δt1 from the start of the radiation of second laser beam 14 to the generation of welding arc 11, the welding position of welding object 6 is heated by second laser beam 14 and laser-induced plasma or plume is generated. The laser-induced plasma or plume can make the start of welding arc 11 easy. Meanwhile, during period Δt2 from the generation of welding arc 11 to the radiation of first laser beam 13, welding arc 11 is generated without any contact between first laser beam 13 and wire 7. The reason is that, if welding arc 11 is generated after the radiation of first laser beam 13 starts, before contacting welding object 6, the wire 7 directly receives irradiation of the first laser beam 13, and is melted before welding arc 11 is generated, which makes it difficult to normally start arc welding.

Next, the operation when welding ends will be described. At time t4, as represented by signals P1 and P2, the radiation of first laser beam 13 and second laser beam 14 ends at the same time. Then, at time t5 after period Δt3 has elapsed, as represented by signal PA, the generation of welding arc 11 ends. In general, in order to end the welding operation, it is necessary to turn off torch 9 and perform a cratering process. However, if first laser beam 13 and second laser beam 14 are radiated for a long time with welding arc 11, the penetration depth of welding object 6 is too large, which may cause the occurrence of burn through. Therefore, period Δt3 makes it possible to perform a cratering process by welding arc 11 without generating burn through.

However, in the above description, first laser beam 13 radiated to wire 7 is not particularly limited. However, in order to prevent wire 7 from being evaporated due to the absorption of an excessive amount of energy from first laser beam 13, it is preferable that the output value of first laser beam 13 be set to a predetermined allowable value or less, that is, a molten droplet formed at the leading end of wire 7 be not rapidly evaporated even though they absorb the energy of first laser beam 13. Actually, the absorption of first laser beam 13 by wire 7 and the evaporation of wire 7 are determined by the power density of the first laser beam at laser radiation position D on the surface of wire 7. It is possible to prevent the molten droplet formed at the tip of wire 7 from being rapidly evaporated by setting the output value of first laser beam 13 to a predetermined allowable value or less considering the above, that is, by setting the power density of first laser beam 13 at laser radiation position D of wire 7 to a predetermined allowable value or less. In addition, in the actual welding operation, the power density of first laser beam 13 radiated to the surface of welding object 6 can be directly managed. When the arrangement relationship between first laser beam 13 and wire 7 is determined considering the above, it is possible to prevent the molten droplet formed at the tip of wire 7 from being rapidly evaporated by setting the output value of first laser beam 13 to a predetermined allowable value or less, that is, by setting the power density of first laser beam 13 at first laser radiation position A of welding object 6 to a predetermined allowable value or less.

As described above, laser oscillator 101 and torch 9 are arranged such that optical axis aa' of first laser beam 13 intersects central axis cc' of wire 7. Therefore, it is possible to directly radiate first laser beam 13 to wire 7. In this way, it is possible to reduce arc energy or arc current required to melt wire 7 and thus reduce the size of molten pool 15 formed by welding arc 11. The limitation of the output value of first laser beam 13 will be described below.

Since second laser beam 14 is not directly radiated to wire 7, the output value of second laser beam 14 is not limited by wire 7. Therefore, it is possible to set the output of second laser beam 14 according to a material forming welding object 6 to be welded, the thickness of welding object 6, a necessary welding speed, or a necessary bead shape. For example, it is possible to perform welding at a high welding speed and with a large penetration depth by increasing the output value of second laser beam 14.

As described above, according to this embodiment, it is possible to reduce arc energy or arc current required to melt wire 7 and thus reduce the size of molten pool 15 formed by the welding arc. In addition, it is possible to prevent the generation of spatter involving the rapid evaporation of the molten droplet formed at the end of wire 7. It is possible to obtain a high welding speed by supplying a high laser output to the welding position using second laser beam 14.

(Second Embodiment)

Figure 4:
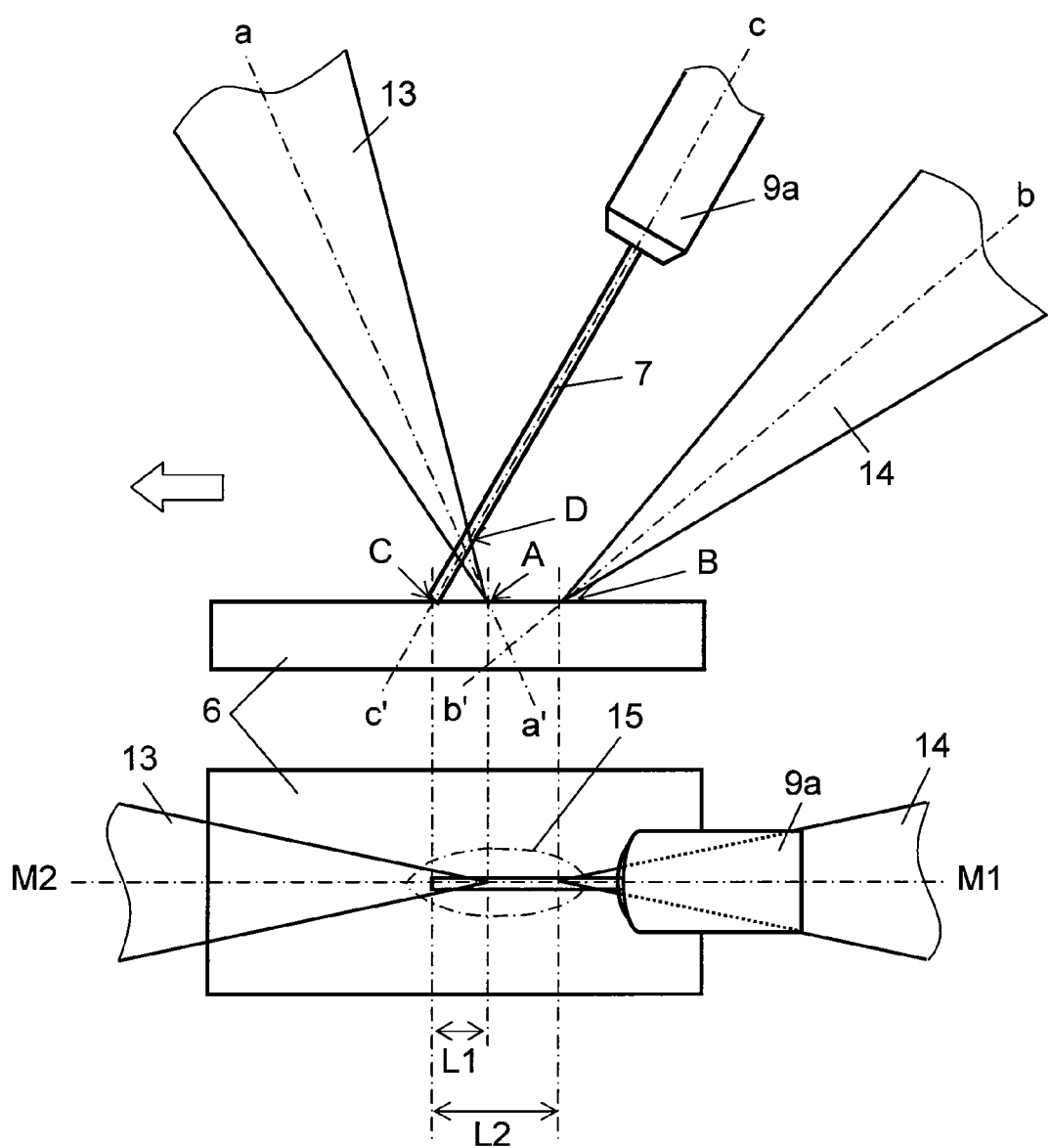
FIG. 4 is a diagram schematically illustrating the correlation between a laser radiation position and a wire target position in a hybrid welding method according to a second embodiment of the invention.

FIG. 4 is a diagram schematically illustrating the correlation between a laser radiation position and a wire target position in a hybrid welding method according to a second embodiment of the invention. Similar to FIG. 2, in FIG. 4, a side view and a top view are arranged in the vertical direction. The second embodiment shown in FIG. 4 is similar to the first embodiment shown in FIG. 2 except for the radiation direction and the radiation position of second laser beam 14. That is, in this embodiment, second radiation position B of second laser beam 14 is spaced predetermined distance L2 from target position C of wire 7. Target position C, first radiation position A, and second radiation position B form a straight line in this order. Target position C, first radiation position A, and second radiation position B are arranged on welding line M1M2 in this order from the end to the origin of the welding direction. In this embodiment, it is practical that the three positions are arranged in a straight line.

In this embodiment, first radiation point A of first laser beam 13 and second radiation point B of second laser beam 14 are disposed at different positions. However, first radiation position A of first laser beam 13 may be the same as second radiation position B of second laser beam 14. In this case, second radiation position B of second laser beam 14 is spaced a predetermined distance L2 from target position C of wire 7. That is, laser-arc distances L1 and L2 are equal to each other.

As such, in this embodiment, it is possible to reduce arc energy or arc current required to melt wire 7 and thus reduce the size of molten pool 15 formed by the welding arc. In addition, it is possible to prevent the generation of spatter involving the rapid evaporation of the molten droplet formed at the tip of wire 7. It is possible to obtain a high welding speed by supplying a high laser output to the welding position using second laser beam 14.

(Third Embodiment)

Figure 5:
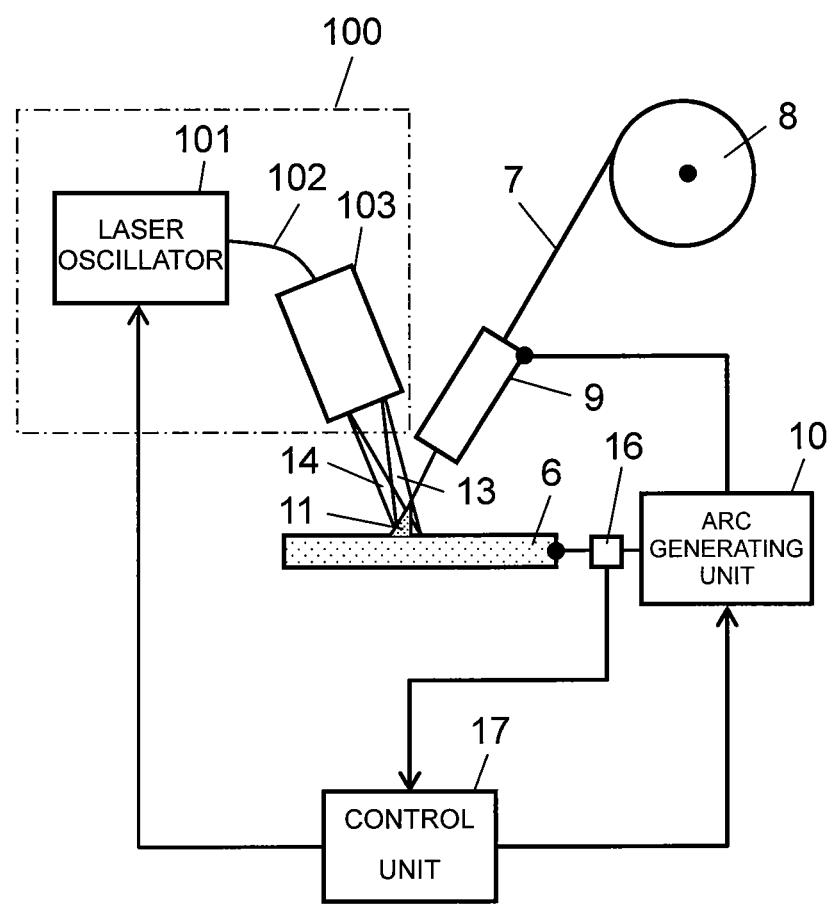
FIG. 5 is a diagram schematically illustrating a hybrid welding apparatus according to a third embodiment of the invention.

FIG. 5 is a diagram schematically illustrating a hybrid welding apparatus according to a third embodiment of the invention. The basic structure of the welding apparatus according to this embodiment is the same as that of the welding apparatus according to the first embodiment shown in FIG. 1. In FIG. 5, laser generating unit 100 includes laser oscillator 101, laser transmitting unit 102, and focusing optical system 103. Laser generating unit 100 emits first laser beam 13 and second laser beam 14 to the welding position of welding object 6. Current detecting unit 16 connected between arc generating unit 10 and welding object 6 detects the timing of a current flowing through wire 7 and welding object 6 when welding arc 11 is generated. Control unit 17 receives an output signal from current detecting unit 16 and controls laser generating unit 100 or arc generating unit 10. Current detecting unit 16 may be incorporated into arc generating unit 10. A detecting unit, such as a Hall element, or a shunt may be used as current detecting unit 16.

The operation of this embodiment will be described below. First, an operation when current detecting unit 16 is not used will be described. In this case, the operation is the same as that in the first embodiment and will be described with reference to FIG. 3. When welding starts, although not shown in the drawings, control unit 17 receives a welding start signal and controls laser generating unit 100 to output only second laser beam 14 at time t1, as represented by signal P2. Then, at time t2 after predetermined period Δt1 has elapsed, control unit 17 controls arc generating unit 10 to instruct wire feeding unit 8 to feed wire 7 to welding object 6, as represented by signal PA, such that welding arc 11 is generated between wire 7 and welding object 6. Then, at time t3 after predetermined period Δt2 has elapsed, control unit 17 controls laser generating unit 100 again to radiate first laser beam 13, as represented by signal P1. When welding ends, although not shown in the drawings, control unit 17 receives a welding end signal and controls laser generating unit 100 to end the radiation of both first laser beam 13 and second laser beam 14 at a time t4, as represented by signals P1 and P2. Then, at time t5 after period Δt3 has elapsed, control unit 17 controls arc generating unit 10 to end the generation of the welding arc, as represented by signal PA.

Figure 6:
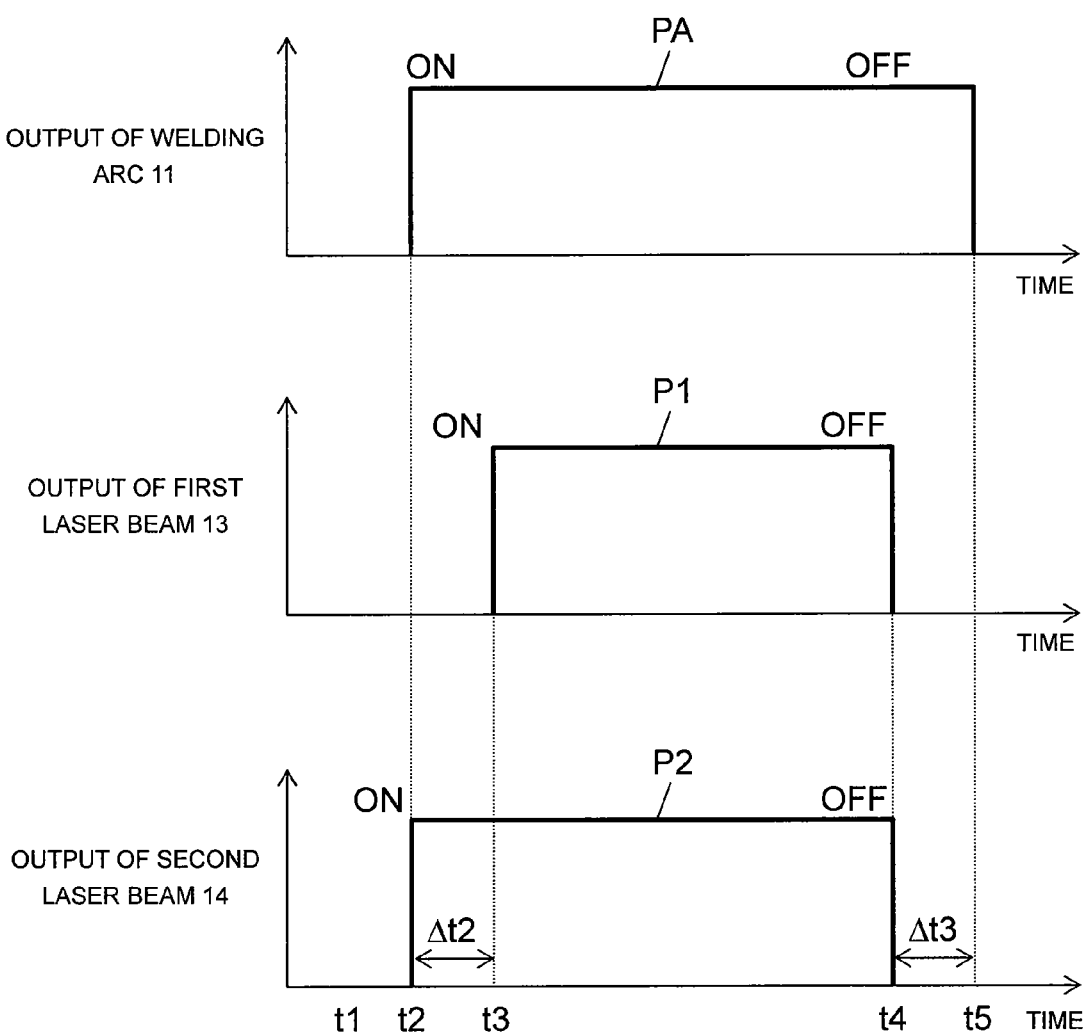
FIG. 6 is a diagram illustrating the operation timing of welding arc, a first laser beam, and a second laser beam in the third embodiment.

Next, an operation when current detecting unit 16 is used will be described with reference to FIG. 6. FIG. 6 is a diagram illustrating the operation timing of the welding arc, the first laser beam, and the second laser beam in this embodiment. When welding starts, although not shown in the drawings, control unit 17 receives a welding start signal and controls arc generating unit 10 to instruct wire feeding unit 8 to feed wire 7 to welding object 6 at time t2, as represented by signal PA, such that welding arc 11 is generated between wire 7 and welding object 6. In this case, current detecting unit 16 detects current flowing between wire 7 and welding object 6 and immediately outputs a current detection signal to control unit 17. control unit 17 receives the current detection signal and controls laser generating unit 100 to immediately output second laser beam 14, as represented by signal P2. Then, at time t3 after period Δt2 has elapsed, control unit 17 controls laser generating unit 100 to radiate first laser beam 13, as represented by signal P1. The operation when welding ends is the same as that described with reference to FIG. 3. As such, even when welding is performed at the timing shown in FIG. 6, the same effects as those in FIG. 3 are obtained.

As described in the first to third embodiments, laser generating unit 100 that outputs two laser beams will be described. In FIGS. 1 and 5, laser generating unit 100 has the following structure as the simplest structure. Laser oscillator 101 outputs two laser beams, and the two laser beams are transmitted to focusing optical system 103 by laser transmitting unit 102 capable of transmitting the two laser beams. Focusing optical system 103 focuses the two laser beams into first laser beam 13 and second laser beam 14 and radiates the first and second laser beams to welding object 6. The gap between first and second radiation positions A and B of first laser beam 13 and second laser beam 14 on welding object 6 can be adjusted by the gap between two laser beams introduced from transmitting unit 102 to focusing optical system 103.

Figure 7:
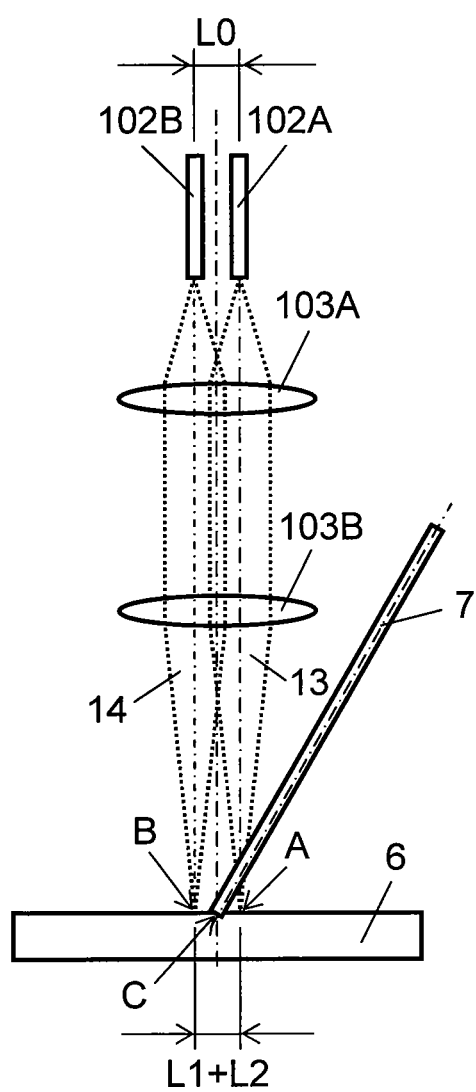
FIG. 7 is a diagram schematically illustrating the structure of a laser transmitting unit and a focusing optical system according to the invention.

This will be described with reference to FIG. 7. FIG. 7 is a diagram schematically illustrating the structure of the laser transmitting unit and the focusing optical system according to the invention. Laser transmitting unit 102 includes first and second laser transmitting units 102A and 102B that respectively transmit two first and second laser beams 13 and 14 generated by laser oscillator 101. First and second laser transmitting units 102A and 102B are arranged with laser transmitting unit gap L0 therebetween. Focusing optical system 103 includes focusing optical part 103A that is provided close to laser transmitting unit 102 and focusing optical part 103B that is provided close to welding object 6. Focusing optical part 103A makes two first and second laser beams 13 and 14 transmitted from laser transmitting units 102A and 102B parallel to each other. Focusing optical part 103B focuses the parallel two first and second laser beams 13 and 14 on first and second radiation positions A and B, respectively. Laser transmitting units 102A and 102B are, for example, optical fibers. Focusing optical parts 103A and 103B are, for example, convex lenses with the same or different focal lengths. As shown in FIG. 7, it is possible to adjust gap L1+L2 between first and second radiation positions A and B of two first and second laser beams 13 and 14 on the surface of welding object 6 by adjusting laser transmitting unit gap L0. For example, when first laser beam 13 and second laser beam 14 are vertical to the surface of welding object 6, L0=L1+L2 is established. As described above, L1 denotes the gap between first radiation position A of first laser beam 13 on the surface of welding object 6 and target position C of wire 7 on the surface of welding object 6. L2 denotes the gap between second radiation position B of second laser beam 14 on welding object 6 and target position C of wire 7 on the surface of welding object 6. When first and second laser beams 13 and 14 are not vertical to the surface of welding object 6, it is possible to calculate laser transmitting unit gap L0 when L1+L2 is known.

Figure 13:
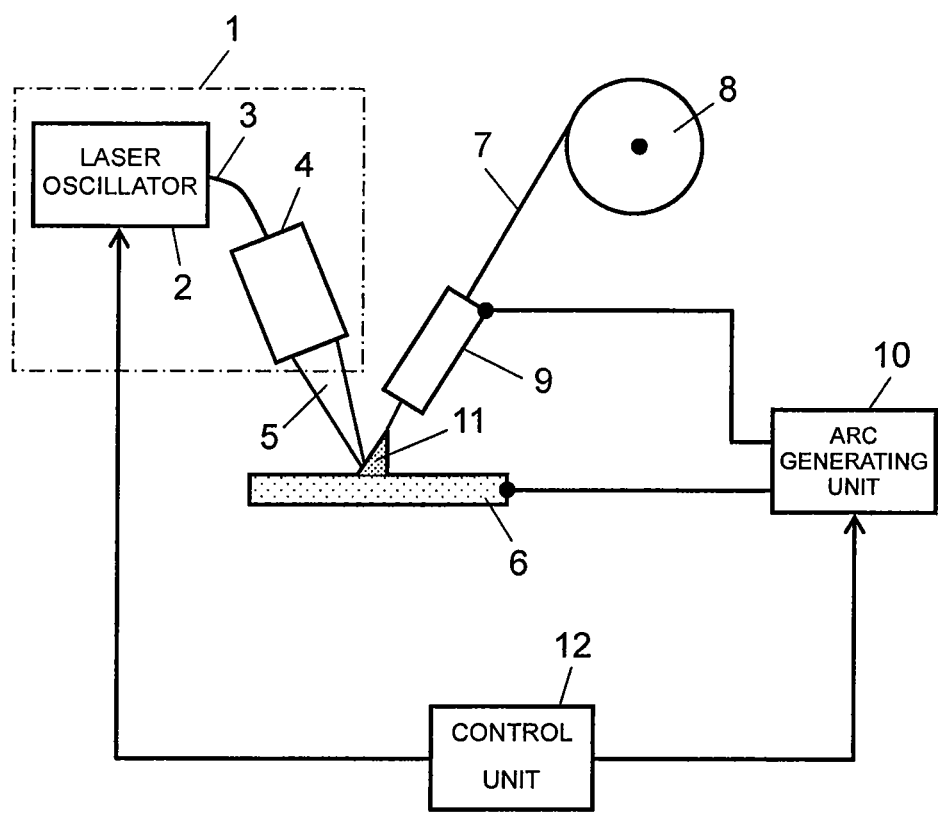
FIG. 13 is a block diagram illustrating the structure of a hybrid welding apparatus according to the related art.

As another structure, laser generating unit 100 may include two laser generating units 1 used in the hybrid welding apparatus according to the related art shown in FIG. 13 and use two laser beams generated by the two laser generating units as first laser beam 13 and second laser beam 14.

In the above-described first to third embodiments, the arc welding and arc generating unit 10 have been used. However, pulsed arc welding or pulsed MIG arc welding may be used instead of the arc welding and a pulsed arc generating unit may be used instead of arc generating unit 10. In this case, it is possible to obtain the same effects as those in the first to third embodiments and reduce the generation of spatter during welding.

In the first to third embodiments, the materials forming welding object 6 and wire 7 are not particularly designated. However, both the welding object and the wire may be made of an aluminum alloy.

(Fourth Embodiment)

In this embodiment, the limitation of the output value of first laser beam 13 in the first to third embodiments will be described in detail. In this embodiment, the limitation of the power density of first laser beam 13 at radiation position D of wire 7 to a power density allowable value or less will be described.

Figure 8:
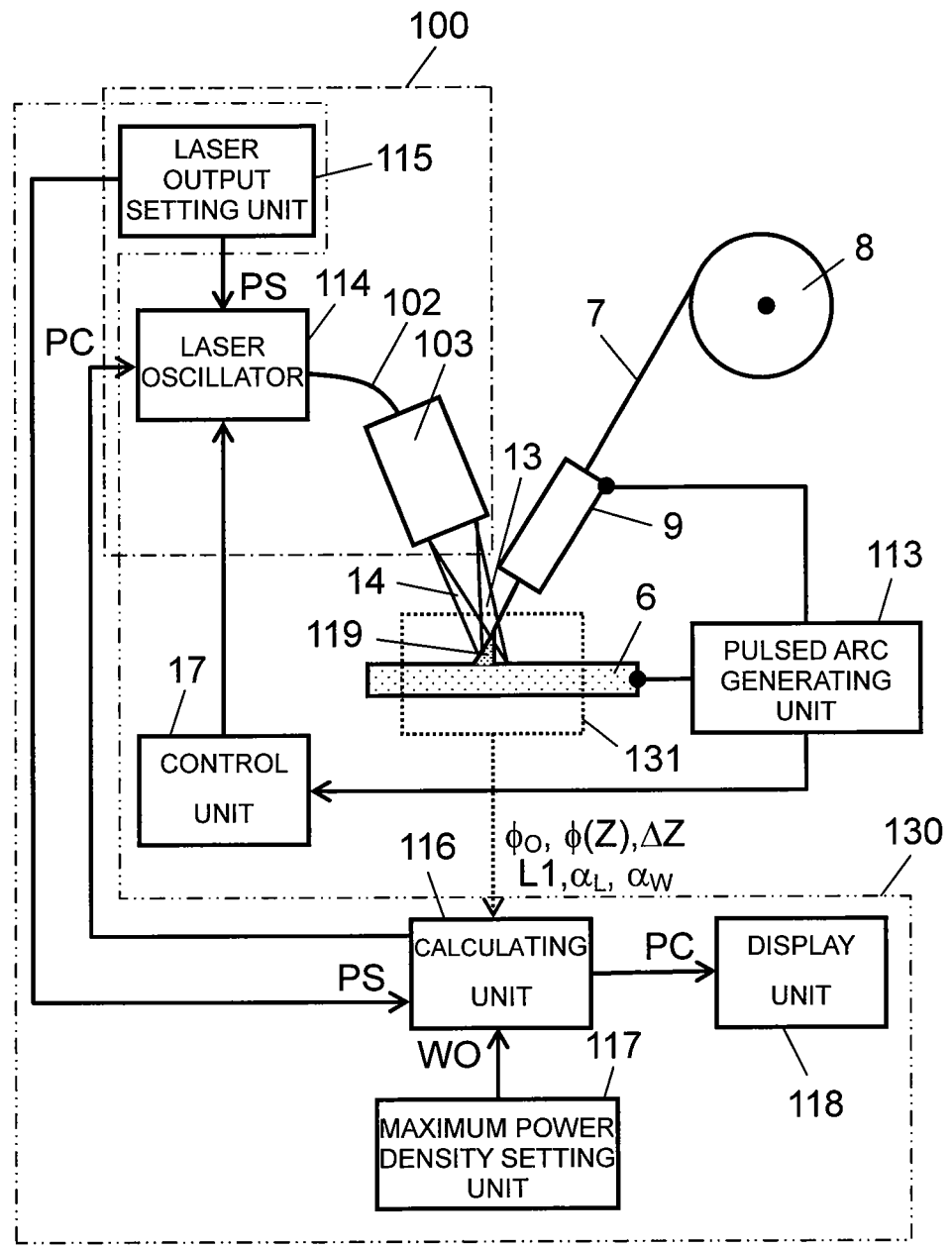
FIG. 8 is a diagram schematically illustrating the structure of a hybrid welding apparatus according to a fourth embodiment of the invention.

FIG. 8 is a diagram schematically illustrating the structure of a hybrid welding apparatus according to a fourth embodiment of the invention. The same structure and operation as those in the first to third embodiments are denoted by the same reference numerals and a detailed description thereof will be omitted. The description is focused on the difference between this embodiment and the first to third embodiments.

In FIG. 8, in this embodiment, pulsed arc generating unit 113 is used instead of arc generating unit 10 shown in FIG. 1, and laser oscillator 114 is used instead of laser oscillator 101. Output calculating unit 130 including laser output setting unit 115, maximum power density setting unit 117, calculating unit 116, and display unit 118 is added. Laser output setting unit 115 sets the laser output value of laser oscillator 114. Maximum power density setting unit 117 sets the power density allowable value of the first laser beam at a predetermined position. Calculating unit 116 calculates the laser output value of laser oscillator 114 using parameters, which will be described below. Display unit 118 displays the laser output value calculated by calculating unit 116.

Although not shown in the drawings, pulsed arc generating unit 113 outputs pulse-shaped welding power including a pulse current, a base current, a pulse width, and a base width to perform pulsed arc welding while generating pulsed arc 119 between wire 7 and welding object 6. Pulsed arc generating unit 113 is used because it is possible to reliably transfer the molten droplet to the welding position of welding object 6 using a pulsed arc without contacting one molten droplet with the molten pool with one pulse and it is possible to effectively prevent the generation of spatter.

Although not shown in the drawings, when the signal from calculating unit 116 is not connected, laser oscillator 114 outputs output set value PS set by laser output setting unit 115 without any change. When the signal from calculating unit 116 is connected, laser oscillator 114 preferentially outputs output calculation value PC input from calculating unit 116.

In the above-mentioned structure, control unit 17 may also serve as laser output setting unit 115. In this case, the signal of control unit 17 is input to calculating unit 116.

As described in the first to third embodiments, laser oscillator 114 radiates first laser beam 13 and second laser beam 14 to welding object 6. However, as described in the first to third embodiments, since second laser beam 14 is not directly radiated to wire 7, the output value of second laser beam 14 is not limited by wire 7. Therefore, in this embodiment, the control of the calculation of the output value of first laser beam 13 will be described.

Figure 9A:
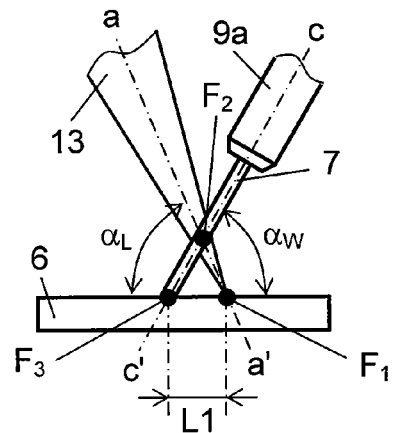
FIG. 9A is a diagram schematically illustrating the arrangement of a first laser beam and a wire in the hybrid welding apparatus.
Figure 9B:
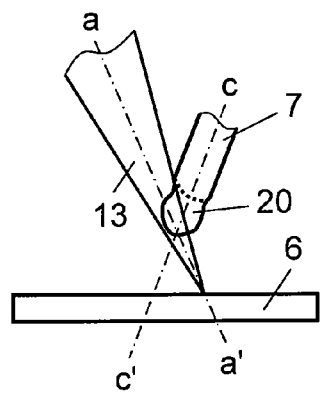
FIG. 9B is a diagram schematically illustrating a molten droplet at the end of the wire in the hybrid welding apparatus.
Figure 10:
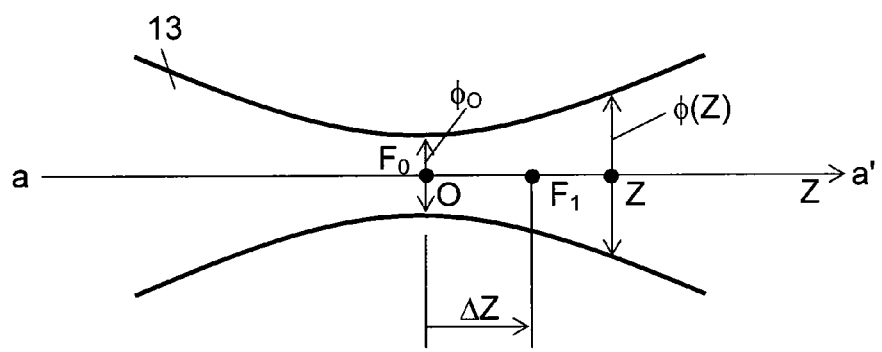
FIG. 10 is a diagram schematically illustrating the propagation state of the first laser beam in the hybrid welding apparatus.

Before the calculation method and the operation principle of calculating unit 116 are described, the arrangement of first laser beam 13 and wire 7 will be described with reference to FIGS. 9A and 9B in order to describe, for example, parameters required for calculation. In addition, the propagation of the radiation direction of first laser beam 13 will be described with reference to FIG. 10. FIG. 9A is a diagram schematically illustrating the arrangement of first laser beam 13 and wire 7. FIG. 9B is a diagram schematically illustrating a droplet. FIG. 10 is a side view schematically illustrating the propagation of the radiation direction of first laser beam 13 to the surface of welding object 6. In FIG. 10, the left side indicates the radiation source of optical axis aa' and the right side indicates the radiation destination. Hereinafter, the same reference numerals as those in the first to third embodiments have the same meaning as that in the first to third embodiments. In FIGS. 9A and 10, $F_1$ indicates a first radiation point (radiation position A), which is an intersection point between optical axis aa' of first laser beam 13 and welding object 6. In FIG. 9A, $F_2$ indicates a radiation point (laser radiation position D), which is an intersection point between optical axis aa' of first laser beam 13 and central axis cc' of wire 7. $F_3$ indicates a target point (target position C), which is an intersection point between central axis cc' of wire 7 and welding object 6. L1 denotes a laser-wire distance indicating the distance between radiation position $F_1$ and target position $F_3$. $\alpha_L$ denotes a laser inclination angle indicating the inclination of optical axis aa' with respect to welding object 6. $\alpha_W$ denotes a wire inclination angle indicating the inclination of central axis cc' with respect to welding object 6. As shown in FIG. 9B, wire 7 is irradiated with first laser beam 13 or is heated by pulsed arc 119 and droplet 20 is formed at the tip of wire 7. In FIG. 10, $F_0$ indicates a focal point obtained when first laser beam 13 is focused by focusing optical system 103. Z indicates a coordinate axis that is aligned with optical axis aa', has focal point $F_0$ as the origin, and has the propagation direction (radiation destination direction) of first laser beam 13 as a positive direction, or the coordinate value of the coordinate axis. $\phi_0$ denotes a focused beam diameter indicating the diameter of first laser beam 13 at focal point $F_0$ (or the origin of coordinate axis Z). $\phi(Z)$ indicates the diameter of first laser beam 13 at arbitrary coordinate value Z. It has been known that beam diameter $\phi(Z)$ has the relationship between focused beam $\phi_0$ and coordinate value Z represented by (Expression 1):

$$\phi(Z)=\phi_0 \cdot (1+\gamma \cdot Z^2)^{1/2} \qquad \text{(Expression 1)}$$

Where γ indicates a constant that is determined by the beam quality of first laser beam 13 and focusing optical system 103. ΔZ indicates the distance between focal point $F_0$ and radiation point $F_1$ and also indicates the amount of defocus of first laser beam 13. Therefore, the beam diameter at radiation point $F_1$ is represented by $\phi(\Delta Z)$. However, for the sign of the amount ΔZ of defocus, when coordinate value Z of radiation point $F_1$ is positive, ΔZ has a positive value, and when coordinate value Z is negative, ΔZ has a negative value. For example, in FIG. 10, ΔZ has a positive value.

The calculation method and the operation principle of calculating unit 116 will be described with reference to FIGS. 8 to 10. Calculating unit 116 receives the following parameters, performs calculation, and outputs the calculation result as output calculation value PC to laser oscillator 114 and display unit 118. Two kinds of parameters are provided, one of which is output set value PS set by laser output setting unit 115 and power density allowable value W0 set by maximum power density setting unit 117. In this embodiment, output set value PS is the output power of laser oscillator 101 that is set by the user according to the kind of welding object 6 or the welding speed. Power density allowable value W0 is the allowable value of power density at radiation position D that is determined by the user. In this embodiment, power density allowable value W0 is a function that is determined by a material of wire 7 and the feed rate of wire 7.

The other kind of parameter is focused light diameter $\phi_0$, beam diameter $\phi(Z)$, the amount ΔZ of defocus, laser-wire distance L1, laser inclination angle $\alpha_L$, and wire inclination angle $\alpha_W$ obtained from welding position neighborhood 131. Although not shown in the drawings, the parameter obtained from welding position neighborhood 131 may be measured in advance according to the welding apparatus used.

In order to prevent the rapid evaporation of droplet 20 as shown in FIG. 9B, power density calculation value WC (which is calculated by (Expression 3), which will be described below) at radiation point $F_2$ of wire 7 may be equal to or less than power density allowable value W0. First, when beam diameter $\phi(F_2)$ at radiation point $F_2$ is calculated by (Expression 1), the following (Expression 2) is obtained:

$$\phi(F_2)=\phi_0 \cdot [1+\gamma \cdot (F_1 F_2 + \Delta Z)^2]^{1/2} \qquad \text{(Expression 2)}$$

(where $F_1 F_2 = L1 \cdot \tan(\alpha_W)/\{\cos(\alpha_L) \cdot [\tan(\alpha_L)+\tan(\alpha_W)]\}$ indicates the distance between the radiation point $F_1$ and the radiation point $F_2$).

When beam diameter $\phi(F_2)$ is calculated, power density calculation value WC at radiation point $F_2$ can be calculated by the following (Expression 3):

$$WC = 4 \cdot PS / \{\pi \cdot [\phi(F_2)]^2 / \sin(\alpha_L + \alpha_W)\}. \quad \text{(Expression 3)}$$

Then, calculating unit 116 compares power density allowable value W0 with power density calculation value WC. As a result, when power density calculation value WC is smaller than power density allowable value W0, calculating unit 116 outputs output set value PS as output calculation value PC to laser oscillator 114 and display unit 118 without any change. On the other hand, when power density calculation value WC is greater than power density allowable value W0, calculating unit 116 can calculate output calculation value PC from power density allowable value W0 and beam diameter $\phi(F_2)$ at radiation point $F_2$ using the following (Expression 4):

$$PC = W0 \cdot \{\pi \cdot [\phi(F_2)]^2 / \sin(\alpha_L + \alpha_W)\} / 4. \quad \text{(Expression 4)}$$

Calculating unit 116 outputs calculated output calculation value PC to laser oscillator 114 and display unit 118.

During welding, laser oscillator 114 outputs calculated output value PC, and display unit 118 displays calculated output value PC. During the actual welding, display unit 118 may be omitted.

It has been described above that it is preferable that power density calculation value WC at radiation point $F_2$ of wire 7 be equal to or less than power density allowable value W0. The reason is as follows. As shown in FIG. 9B, even after droplet 20 is formed at the tip of wire 7, wire 7 is continuously irradiated with first laser beam 13 or it is continuously heated by pulsed arc 119. Therefore, the size of droplet 20 increases. When the subsequent pulse period starts, constriction occurs at the boundary between droplet 20 and a solid portion of wire 7. During the pulse period, constriction is grown, and droplet 20 is separated from the tip of wire 7 and is then moved to the welding position of welding object 6 immediately before or after the pulse period ends. Droplet 20 is continuously irradiated with first laser beam 13 until it is separated from the tip of wire 7 and passes through the radiation range of first laser beam 13. Therefore, when the power density of first laser beam 13 on the surface of droplet 20 is too high, the temperature of droplet 20 is too high and reaches a boiling point. Then, droplet 20 is rapidly evaporated, which causes spatter. Therefore, in order to prevent the generation of spatter due to the rapid evaporation of droplet 20, it is necessary to limit the power density at radiation point $F_2$ of wire 7. In FIG. 10, radiation point $F_1$ and focal point $F_0$ are disposed at different positions, but they may be disposed at the same position. In this case, $\Delta Z$ is 0.

Figure 11A:
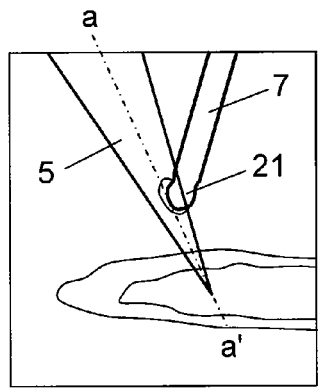
FIG. 11A is a diagram illustrating a state before the generation of spatter in the hybrid welding apparatus.
Figure 11B:
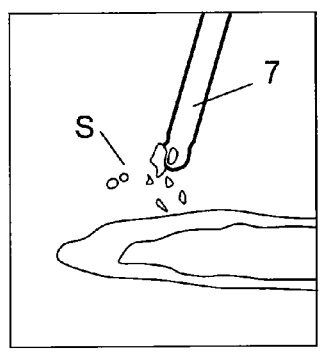
FIG. 11B is a diagram illustrating a variation in the generation of spatter in the hybrid welding apparatus.
Figure 11C:
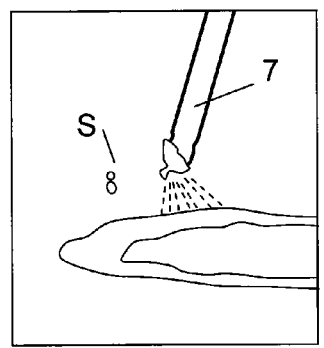
FIG. 11C is a diagram illustrating a variation in the generation of spatter in the hybrid welding apparatus.
Figure 11D:
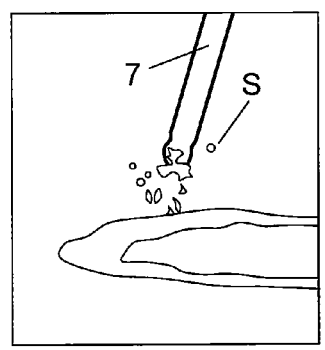
FIG. 11D is a diagram illustrating a variation in the generation of spatter in the hybrid welding apparatus.
Figure 11E:
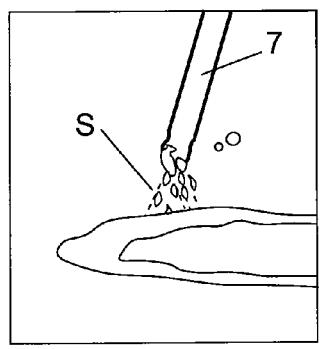
FIG. 11E is a diagram illustrating a variation in the generation of spatter in the hybrid welding apparatus.
Figure 11F:
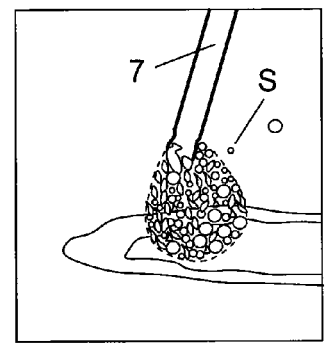
FIG. 11F is a diagram illustrating a variation in the generation of spatter in the hybrid welding apparatus.

FIGS. 11A to 11F are diagrams illustrating a variation in the state of spatter when power density is too high and the wire end molten droplet is rapidly evaporated during the pulsed MIG arc welding of aluminum alloy. That is, FIGS. 11A to 11F show a variation in the state of spatter at an interval of 1 ms from FIG. 11A. FIG. 11A shows the actual relative positional relationship between droplet 20 and laser beam 5 at an arbitrary timing during welding. In this state, droplet 20 is irradiated with first laser beam 13, but droplet 20 is not rapidly evaporated. As shown in FIGS. 11B to 11F, droplet 20 is irradiated with first laser beam 13, the evaporation rate of droplet 20 is gradually increased, and droplet 20 is scattered as spatter S.

The experiment shown in FIGS. 11A to 11F was conducted under the following conditions. Welding object 6 is an A5052 aluminum alloy with a thickness of 2 mm and wire 7 is an A5356 aluminum alloy with a diameter of 1.2 mm. First laser beam 13 is a fiber laser with a focused light diameter of 0.2 mm and has an output of 4.0 kW, a fiber diameter of 0.1 mm, a collimator lens focal length of 125 mm, a focusing lens focal length of 250 mm, and a defocused beam diameter of 0.9 mm. Laser-wire distance L1 is 2 mm and the welding speed is 4 m/min.

In order to check the effects of the embodiments of the invention, hybrid welding was performed using an A5356 wire (diameter: 1.2 mm) for an A5052 aluminum alloy with a thickness of 2 mm while fixing the beam diameter on the surface of the welding object and changing only the laser output. FIG. 12 is a diagram illustrating the outward appearance of beads when the laser output is changed. As can be seen from columns a to d in FIG. 12, when the laser output was equal to or less than 3.0 kW (the calculated value of the power density at radiation point $F_2$ of wire 7 is 2.33 kW/mm$^2$), the bead surface including a cleaning region in the vicinity of the welding position (in FIG. 12, the upper and lower sides in the vicinity of the welding position) was good. Meanwhile, as can be seen from column e in FIG. 12, when the laser output was 4.0 kW (the calculated value of the power density at radiation point $F_2$ of wire 7 is 3.11 kW/mm$^2$), the cleaning region was narrowed and the bead surface was darkened. In addition, a lot of small spatters were adhered to the vicinity of the bead. The black contaminants on the bead surface or a lot of small spatters in the vicinity of the surface of the bead are caused by the rapid evaporation of the droplet irradiated with the laser beam during welding. The aspect was as shown in FIGS. 11B to 11F. The conditions of the experiment shown in FIG. 12 are the same as those in FIGS. 11A to 11F except the laser power.

As such, according to this embodiment, first laser beam 13 and wire 7 are arranged such that first laser beam 13 is directly radiated to wire 7 supplied to welding object 6, that is, optical axis aa' of first laser beam 13 intersects central axis cc' of wire 7. In addition, welding is performed such that the power density of first laser beam 13 at laser radiation point $F_2$ of wire 7 is equal to or less than a predetermined value. In this way, it is possible to prevent the generation of spatter due to the rapid evaporation of droplet 20.

In the above description, the pulsed MIG arc welding is given as an example of the pulsed arc welding, but the invention is not limited thereto.

In this embodiment, both the welding object and the wire are made of an aluminum alloy, but the invention is not limited thereto.

In the above description, welding was performed such that the power density of first laser beam 13 at laser radiation point $F_2$ of wire 7 was equal to or less than a predetermined value. In this embodiment, the predetermined value was calculated and set by a function that was determined by the material forming wire 7 and the feed rate of wire 7. The reason is as follows. For the material of wire 7, when the material is changed, the boiling point of droplet 20 formed at the tip of wire 7 is changed and the absorptance of the material with respect to first laser beam 13 is also changed. Meanwhile, for the feed rate of wire 7, when the feed rate of wire 7 is changed, the interaction time between first laser beam 13 and wire 7 is changed. Therefore, the heating time until wire 7 is melted and reaches the boiling point is also changed.

In particular, when wire 7 made of an aluminum alloy is used, the boiling point of wire 7 varies greatly depending on the amount of Mg (magnesium) included in wire 7. Therefore, the predetermined value may be a function of the amount of Mg included in wire 7.

Specifically, when a wire made of a 5000-series aluminum alloy was used, the predetermined value was set in the range of 0.5 kW/mm$^2$ to 3 kW/mm$^2$ and the welding result was good. When a wire made of a 4000-series aluminum alloy was used, the predetermined value was set in the range of 0.5 kW/mm² to 5 kW/mm² and the welding result was good.

In this embodiment, welding was performed such that the power density of first laser beam 13 at laser radiation point $F_2$ of wire 7 was equal to or less than a predetermined value. However, the output value of first laser beam 13 may be limited such that the power density of first laser beam 13 at radiation point $F_1$ (first radiation position A) of first laser beam 13 on the surface of welding object 6 is equal to or less than a predetermined allowable value. In this case, similar to the fourth embodiment, it is possible to calculate the power density of first laser beam 13 using Expressions 1 to 4.

That is, in the invention, the output value of first laser beam 13 may be limited such that the power density of first laser beam 13 at an arbitrary radiation point other than laser radiation point $F_2$ or radiation point $F_1$ is equal to or less than a predetermined value. Therefore, in the invention, it is possible to prevent the generation of spatter involving the rapid evaporation of droplet 20 by setting the output value of first laser beam 13 to be equal to or less than a predetermined allowable value.

The invention claimed is:

1. A hybrid welding method of feeding a wire to a welding position of a welding object while radiating a first laser beam and a second laser beam to the welding position, thereby performing arc welding between the welding object and the wire, comprising:
    radiating the first laser beam to a first radiation position of the welding object through the wire such that an optical axis of the first laser beam intersects a central axis of the wire; and
    radiating the second laser beam to a second radiation position of the welding object that is spaced a predetermined distance from a target position where the central axis of the wire intersects the welding object,
    wherein the first radiation position, the second radiation position, and the target position are disposed on a welding line of the welding object, and
    the central axis of the wire does not intersect an optical axis of the second laser beam over the welding object.

2. The hybrid welding method of claim 1, wherein an output value of the first laser beam is set not to cause evaporation of a molten droplet at a tip of the wire.

3. The hybrid welding method of claim 1, wherein an output value of the first laser beam is set such that the power density of the first laser beam at the first radiation position of the welding object is equal to or less than a power density sufficient to cause evaporation of a molten droplet at a tip of the wire.

4. The hybrid welding method of claim 1, wherein an output value of the first laser beam is set such that the power density of the first laser beam at the radiation position of the wire where the optical axis of the first laser beam intersects the central axis of the wire is equal to or less than a power density sufficient to cause evaporation of a molten droplet at a tip of the wire.

5. The hybrid welding method of claim 1, wherein an arc is generated between the wire and the welding object, and
    both the first laser beam and the second laser beam are radiated after the generation of the arc is detected.

6. The hybrid welding method of claim 1, wherein the target position is disposed ahead of the first radiation position in the movement direction of the welding position, and the second radiation position is spaced the predetermined distance from the target position in the movement direction of the welding position.

7. The hybrid welding method of claim 1, wherein the target position is disposed ahead of the first radiation position in the movement direction of the welding position, and
    the second radiation position is spaced the predetermined distance from the target position in a direction opposite to the movement direction of the welding position.

8. The hybrid welding method of claim 1,
    wherein only the optical axis of the first laser beam intersects the central axis of the wire.

9. The hybrid welding method of claim 1,
    wherein the arc welding is pulsed MIG arc welding.

10. The hybrid welding method of claim 1,
    wherein both the welding object and the wire are made of an aluminum alloy.

11. The hybrid welding method of claim 1,
    wherein an arc is generated between the wire and the welding object after a predetermined time has elapsed from the radiation of the second laser beam, and
    the first laser beam is radiated after the generation of the arc is detected.

12. The hybrid welding method of claim 2,
    wherein the predetermined value is determined by a material and a wire feed rate of the wire.

13. The hybrid welding method of claim 10,
    wherein the predetermined value is determined by the amount of magnesium included in the wire made of the aluminum alloy.

14. The hybrid welding method of claim 4,
    wherein, when the wire is made of a 5000-series aluminum alloy, the predetermined value is set such that the power density of the first laser beam is in the range of 0.5 kW/mm² to 3 kW/mm².

15. The hybrid welding method of claim 4,
    wherein, when the wire is made of a 4000-series aluminum alloy, the predetermined value is set such that the power density of the first laser beam is in the range of 0.5 kW/mm² to 5 kW/mm².

16. A hybrid welding apparatus comprising:
    a laser generating unit that radiates a first laser beam and a second laser beam to a welding position of a welding object;
    a wire feeding unit that feeds a wire to the welding position through a torch;
    an arc generating unit that supplies power for arc welding to the wire and the welding object; and
    a control unit that controls the laser generating unit and the arc generating unit,
    wherein the laser generating unit is arranged so as to radiate the first laser beam to a first radiation position of the welding object through the wire such that an optical axis of the first laser beam intersects a central axis of the wire,
    the laser generating unit is arranged such that the second laser beam is radiated to a second radiation position of the welding object that is spaced a predetermined distance from a target position where the central axis of the wire intersects the welding object,
    the first radiation position, the second radiation position, and the target position are arranged so as to be disposed on a welding line of the welding object, and
    the central axis of the wire does not intersect an optical axis of the second laser beam over the welding object.

17. The hybrid welding apparatus of claim 16,
wherein the control unit sets an output value of the first laser beam not to cause evaporation of a molten droplet at a tip of the wire.

18. The hybrid welding apparatus of claim 16,
wherein the control unit sets an output value of the first laser beam such that the power density of the first laser beam at the first radiation position of the welding object is equal to or less than a power density sufficient to cause evaporation of a molten droplet at a tip of the wire.

19. The hybrid welding apparatus of claim 16,
wherein the control unit sets an output value of the first laser beam such that the power density of the first laser beam at the radiation position of the wire where the optical axis of the first laser beam intersects the central axis of the wire is equal to or less than a power density sufficient to cause evaporation of a molten droplet at a tip of the wire.

20. The hybrid welding apparatus of claim 16,
wherein the control unit generates an arc between the wire and the welding object, and
the control unit radiates both the first laser beam and the second laser beam after the generation of the arc is detected.

21. The hybrid welding apparatus of claim 16,
wherein the target position is disposed ahead of the first radiation position in the movement direction of the welding position, and
the second radiation position is spaced the predetermined distance from the target position in the movement direction of the welding position.

22. The hybrid welding apparatus of claim 16,
wherein the target position is disposed ahead of the first radiation position in the movement direction of the welding position, and
the second radiation position is spaced the predetermined distance from the first radiation position in a direction opposite to the movement direction of the welding position.

23. The hybrid welding apparatus of claim 16,
wherein the laser generating unit is arranged such that only the optical axis of the first laser beam intersects the central axis of the wire.

24. The hybrid welding apparatus of claim 16,
wherein the arc welding is pulsed MIG arc welding.

25. The hybrid welding apparatus of claim 16,
wherein both the welding object and the wire are made of an aluminum alloy.

26. The hybrid welding apparatus of claim 16,
wherein the control unit generates an arc between the wire and the welding object after a predetermined time has elapsed from the radiation of the second laser beam, and
the control unit radiates the first laser beam after the generation of the arc is detected.

27. The hybrid welding apparatus of claim 17,
wherein the predetermined value is determined by a material and a wire feed rate of the wire.

28. The hybrid welding apparatus of claim 19,
wherein the predetermined value is determined by the amount of magnesium included in the wire made of the aluminum alloy.

29. The hybrid welding apparatus of claim 19,
wherein, when the wire is made of a 5000-series aluminum alloy, the predetermined value is set such that the power density of the first laser beam is in the range of 0.5 kW/mm$^2$ to 3 kW/mm$^2$.

30. The hybrid welding apparatus of claim 19,
wherein, when the wire is made of a 4000-series aluminum alloy, the predetermined value is set such that the power density of the first laser beam is in the range of 0.5 kW/mm$^2$ to 5 kW/mm$^2$.

31. A hybrid welding apparatus comprising:
a laser generating unit that radiates a first laser beam and a second laser beam to a welding position of a welding object;
a wire feeding unit that feeds a wire to the welding position through a torch;
a pulsed arc generating unit that supplies power for arc welding to the wire and the welding object;
a control unit that controls the laser generating unit and the pulsed arc generating unit;
a laser output setting unit that sets the output of the first laser beam of the laser generating unit;
a maximum power density setting unit that sets a maximum power density value of the first laser beam at a predetermined position not to cause evaporation of a molten droplet at a tip of the wire; and
a calculating unit that calculates a power density calculation value of the first laser beam,
wherein the laser generating unit is arranged so as to radiate the first laser beam to a first radiation position of the welding object through the wire such that an optical axis of the first laser beam intersects a central axis of the wire,
the laser generating unit is arranged such that the second laser beam is radiated to a second radiation position of the welding object that is spaced a predetermined distance from a target position where the central axis of the wire intersects the welding object,
the first radiation position, the second radiation position, and the target position are arranged so as to be disposed on a welding line of the welding object,
the calculating unit performs calculation using parameters including an output set value set by the laser output setting unit, the maximum power density value set by the maximum power density setting unit, a focused beam diameter at a focal point when the first laser beam is focused, a beam diameter at an arbitrary coordinate value when the focal point of the first laser beam is the origin and the optical axis of the first laser beam in a propagation direction is a coordinate axis, the amount of defocus when the first laser beam is radiated to the first radiation point of the welding object, a laser-wire distance from a first radiation point of the first laser beam on the surface of the welding object to a target point of the wire, a laser inclination angle of the optical axis of the first laser beam with respect to the surface of the welding object, and a wire inclination angle of the central axis of the wire with respect to the surface of the welding object, and
when the power density calculation value at a laser radiation point where the optical axis of the first laser beam intersects the central axis of the wire, which is calculated from the parameters, is greater than the maximum power density value, the calculating unit calculates an output calculation value using the maximum power density value and the parameters and outputs the calculated value to the laser generating unit, thereby performing welding such that the power density of the first laser beam at an intersection point between the optical axis of the first laser beam and the central axis of the wire is equal to or less than the maximum power density value.

* * * * *